Oct. 27, 1925.

G. SCHWORETZKY 1,559,052

PRESSURE STORAGE VESSEL

Filed Nov. 9, 1921

Gustav Schworetzky
Inventor

By Knight Bros
Attorneys

Patented Oct. 27, 1925.

1,559,052

UNITED STATES PATENT OFFICE.

GUSTAV SCHWORETZKY, OF ESSLINGEN ON THE NECKAR, WURTTEMBERG, GERMANY.

PRESSURE STORAGE VESSEL.

Application filed November 9, 1921. Serial No. 514,096.

*To all whom it may concern:*

Be it known that I, GUSTAV SCHWORETZKY, a citizen of the German Empire, residing at Esslingen on the Neckar, Wurttemberg, Germany, have invented certain new and useful Improvements in Pressure Storage Vessels, of which the following is a specification.

This invention relates to a method for hermetically sealing pressure storage vessels closed from the inside. The object of the invention is to press the parts forming the seal so tightly together that the contacting surfaces form an almost homogeneous joint. In carrying out the method the closing body is from the inside of the vessel strongly forced against its seat, for instance by considerably increasing the internal pressure in the vessel by the application of heat or by the aid of a spring or by both means in combination.

The invention also relates to a pressure storage vessel suitable for carrying out the improved method.

Figure 1:
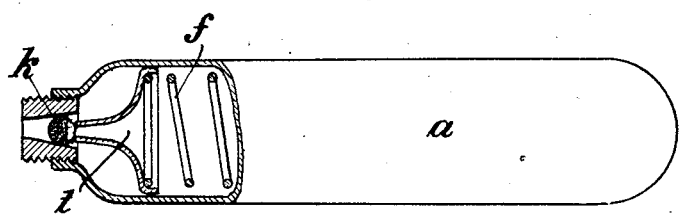
Figure 2:
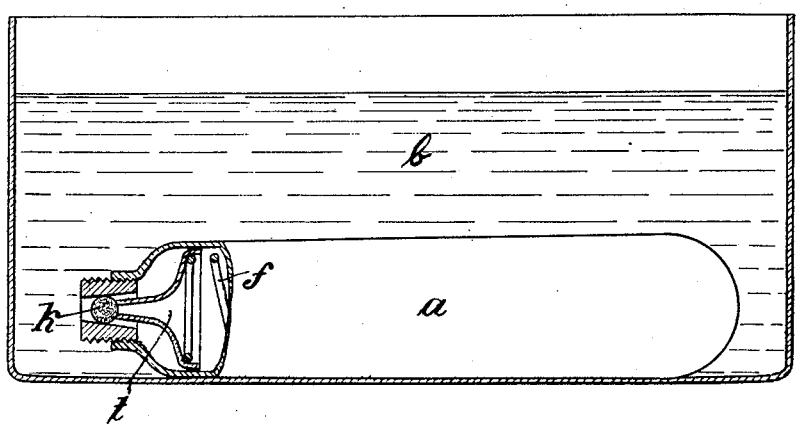

In the accompanying drawings:

Fig. 1 illustrates a vessel suitable for carrying out the improved method in sectional elevation and Fig. 2 such a vessel disposed in a tank containing a hot liquid. Similar parts are indicated by the same letters of reference in both figures.

Referring to Fig. 1 $a$ is the pressure storage vessel or container filled with, for instance, liquid carbonic acid and sealed from inside by a ball-valve $k$. If such a vessel is put into a tank $b$ containing a hot liquid, the pressure within it is raised by several hundred atmospheres, whereby the ball-valve $k$ is forced deeper into its seating, which may for instance be conical. In this manner the contacting surfaces are forced so tightly together that an abutment of the pressed together parts is formed which is equivalent to a homogeneous joint. As experience has shown, that after cooling the vessel, the pressure within it remains at almost 70 atmospheres, the close contact is permanently maintained.

Instead of the ball-valve another closing element, for instance a conical plug may be employed. A spring $f$ adapted to press upon the ball by means of a funnel $t$ may also be provided within the vessel. This construction is particularly useful for pressure storage vessels which after partial discharge should again be closed by the return of the valve body upon its seat. This funnel returns the valve body upon its seat formed by the aid of the high pressure under the combined action of the gas pressure and the spring. This seat is preferably made of a soft material by, for instance, coating it with lead. In the alternative the valve, the ball or plug, or both the seat and the valve may be coated with lead.

It will be readily understood that the construction of the vessel or container may be modified in various ways without departing from the spirit of the invention or sacrificing any of its advantages.

What I claim as my invention and desire to secure by United States Letters Patent is:

1. The improved method of hermetically sealing storage vessels closed from the inside which consists in pressing a valve upon its seat from the inside by means of pressure generated by heat application, the pressure exerted being sufficient to effect an adhering contact between the valve and seat.

2. In a pressure storage vessel, a hermetic sealing device comprising a valve seat in said vessel, a valve within said vessel for cooperating with said seat, and a soft metallic coating on one of said valve parts whereby said valve parts are joined in adhering contact on the development of pressure within the vessel.

In testimony whereof I affix my signature.

GUSTAV SCHWORETZKY.